(12) United States Patent
Nguyen et al.

(10) Patent No.: US 9,900,884 B2
(45) Date of Patent: Feb. 20, 2018

(54) WIRELESS COMMUNICATIONS SYSTEM AND METHOD IN A WIRELESS COMMUNICATIONS SYSTEM

(71) Applicant: NEC Corporation, Minato-ku, Tokyo (JP)

(72) Inventors: Phong Nguyen, Victoria (AU); Aziz Rahman, Victoria (AU); Kevin Lin, Victoria (AU)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/442,795

(22) Filed: Feb. 27, 2017

(65) Prior Publication Data
US 2017/0188343 A1 Jun. 29, 2017

Related U.S. Application Data

(62) Division of application No. 14/425,082, filed as application No. PCT/JP2013/000725 on Feb. 8, 2013.

(30) Foreign Application Priority Data

Sep. 21, 2012 (AU) .................... 2012904117

(51) Int. Cl.
| | |
|---|---|
| H04W 72/04 | (2009.01) |
| H04W 72/12 | (2009.01) |
| H04W 4/00 | (2009.01) |
| H04L 5/00 | (2006.01) |
| H04W 88/08 | (2009.01) |

(52) U.S. Cl.
CPC ......... *H04W 72/042* (2013.01); *H04L 5/0094* (2013.01); *H04W 4/005* (2013.01); *H04W 72/0453* (2013.01); *H04W 72/1289* (2013.01); *H04L 5/0007* (2013.01); *H04L 5/0044* (2013.01); *H04L 5/0053* (2013.01); *H04W 88/08* (2013.01)

(58) Field of Classification Search
CPC ... H04L 5/0092; H04L 5/0051; H04L 5/0053; H04W 4/005; H04W 72/042; H04W 72/0453
See application file for complete search history.

(56) References Cited

U.S. PATENT DOCUMENTS

| | | | |
|---|---|---|---|
| 9,538,502 B2 | 1/2017 | Chen et al. | |
| 2013/0044727 A1* | 2/2013 | Nory | H04L 5/0092 370/330 |
| 2013/0083753 A1 | 4/2013 | Lee et al. | |
| 2013/0155974 A1* | 6/2013 | Papasakellariou | H04W 72/042 370/329 |

(Continued)

OTHER PUBLICATIONS

International Search Report for PCT Application No. PCT/JP2013/000725, dated Apr. 16, 2013.

(Continued)

*Primary Examiner* — Redentor Pasia

(57) ABSTRACT

There is provided a method in a wireless base station (300), the method comprise transmitting, to a wireless device (100) having a reduced data bandwidth or a reduced control and data bandwidth, control and data signalling within a first bandwidth, in respective control and data regions, wherein signalling within the data region intended for the wireless device (100) is constrained within a second bandwidth which is narrower than the first bandwidth.

4 Claims, 12 Drawing Sheets

(56) References Cited

U.S. PATENT DOCUMENTS

| | | | |
|---|---|---|---|
| 2013/0250880 A1* | 9/2013 | Liao | H04W 72/042 370/329 |
| 2013/0308572 A1 | 11/2013 | Sayana et al. | |
| 2013/0315159 A1* | 11/2013 | Xia | H04W 72/042 370/329 |
| 2015/0333880 A1* | 11/2015 | Yi | H04L 5/001 370/329 |

OTHER PUBLICATIONS

ZTE Corporation, "TP for evaluation/analysis of reduction of maximum bandwidth", 3GPP TSG-RAN WG1#68 R1-120290, 2012.02. 06-10 Cited in ISR.

Qualcomm Incorporated, "Impact of Reduction of Maximum Bandwidth on MTC", 3GPP TSG-RAN WG1#68 R1-120563, 2012.02. 06-10 Cited in ISR.

3rd Generation Partnership Project; Technical Specification Group Radio Access Network; "Study on provision of low-cost MTC UEs based on LTE; (Release 11)", 3GPP TR 36.888, Jun. 2012, V2.0.0, section 6.2 Cited in ISR as 3GPP TR 36.888, Jun. 2012, v2.0.0.

The extended European Search Report of EP Application No. EP13840070.0 dated Mar. 22 2016.

Samsung: "Impact of bandwidth reduction on low-cost MTC UE procedures", 3GPP Draft; R1-121654 Impact of BW Reduction on Low-Cost MTC UE Procedures, 3rd Generation Partnership Project (3GPP), vol. RAN WG1, no. Jeju, Korea; Mar. 26, 2012-Mar. 30, 2012. Mar. 20, 2012 (Mar. 20, 2012). XP050599917. Cited in EESR.

NEC Group: "Maximum bandwidth reduction for low-cost MTC UE based on LTE", 3GPP Draft; R1-120259, 3rd Generation Partnership Project (3GPP). vol. RAN WG1, no. Dresden, Germany; Feb. 6, 2012-Feb. 10, 2012, Jan. 31, 2012 (Jan. 31, 2012), XP050562813. Cited in EESR.

IPwireless Inc: "Backwards compatible support for reduced bandwidth LTE UEs", 3GPP Draft; R1-120799. 3rd Generation Partnership Project (3GPP), vol. RAN WG1. no. Dresden. Germany; Feb. 6, 2012-Feb. 10, 2012. Jan. 31, 2012 (Jan. 31, 2012). XP050563142. Cited in EESR.

Alcatel-Lucent et al: "Support of reduced maximum bandwidth for low-cost MTC UEs", 3GPP Draft; R1-120510 MTC Reduced Bandwidth. 3rd Generation Partnership Project (3GPP). vol. RAN WG1. no. Dresden. Germany; Feb. 6, 2012-Feb. 10, 2012. Feb. 2, 2012 (Feb. 2, 2012). XP050563328 Cited in EESR.

Huawei et al: "Bandwidth reduction for low cost MTC UE and text proposal". 3GPP Draft; R1-120051. 3rd Generation Partnership Project (3GPP). vol. RAN WG1. no. Dresden. Germany; Feb. 6, 2012-Feb. 10, 2012. Jan. 31, 2012 (Jan. 31, 2012). XP050562638 Cited in EESR.

Renesas Mobile Europe Ltd: "Considerations for Low-Cost MTC LTE UEs". 3GPP Draft; R1-120388. 3rd Generation Partnership Project (3GPP). vol. RAN WG1. no. Dresden. Germany; Feb. 6, 2012-Feb. 10, 2012. Feb. 2, 2012 (Feb. 2, 2012). XP050563311 CIted in EESR.

USPTO Office Action (PTOL-326) corresponding U.S. Appl. No. 14/425,082 with Notice of References cited in PTOL-892 dated Mar. 10, 2017.

\* cited by examiner

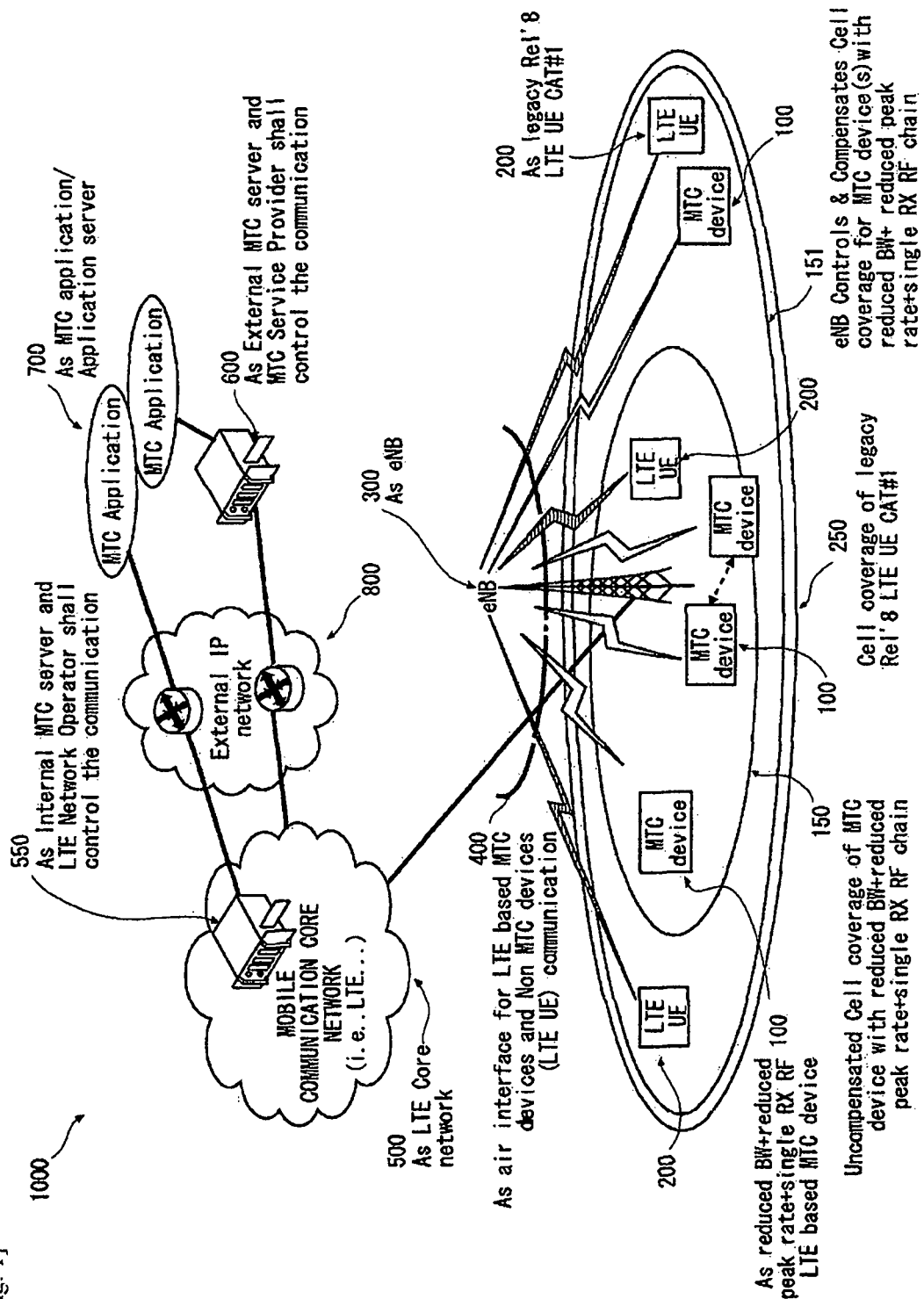
[Fig. 1]

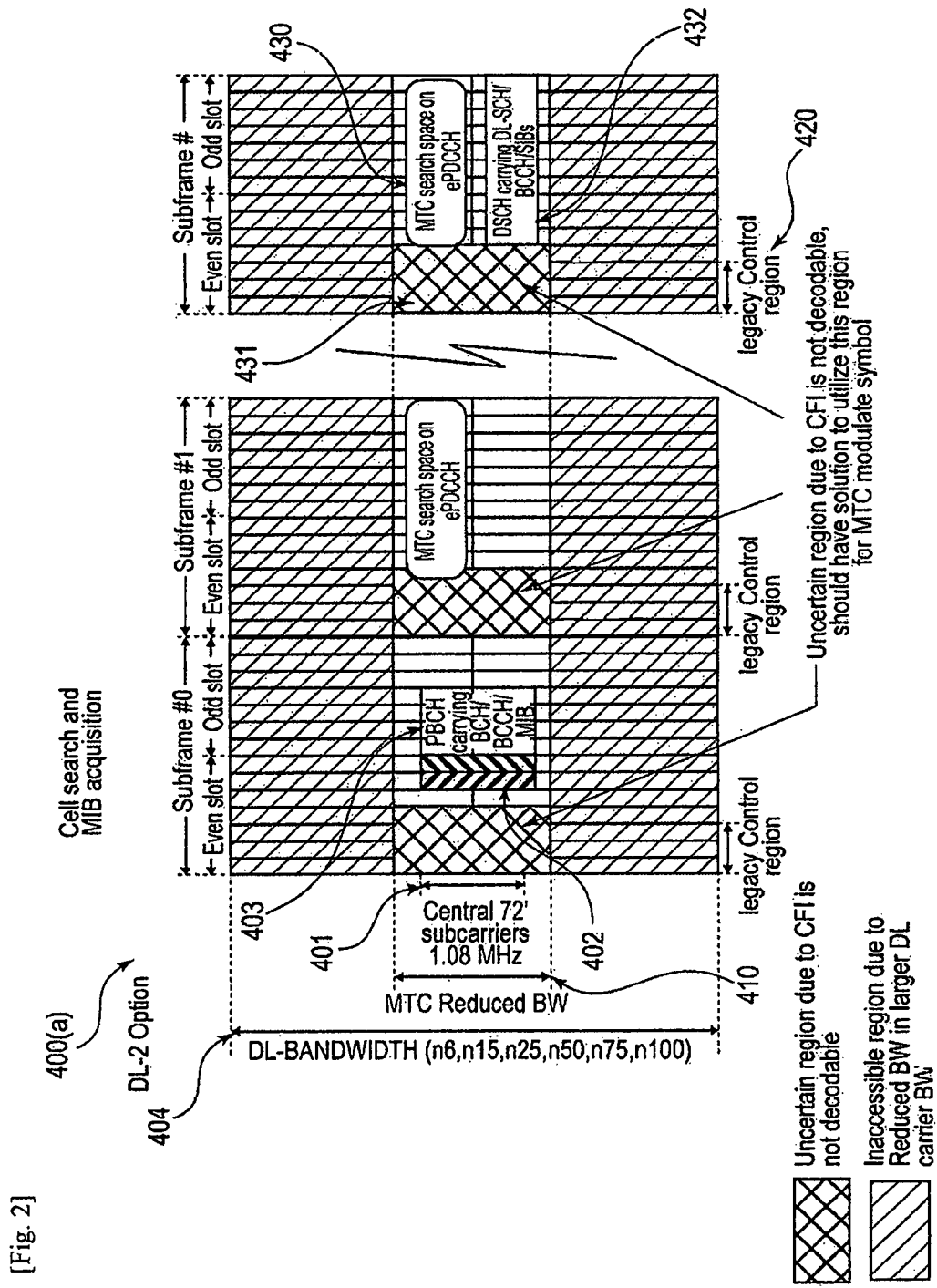
[Fig. 2]

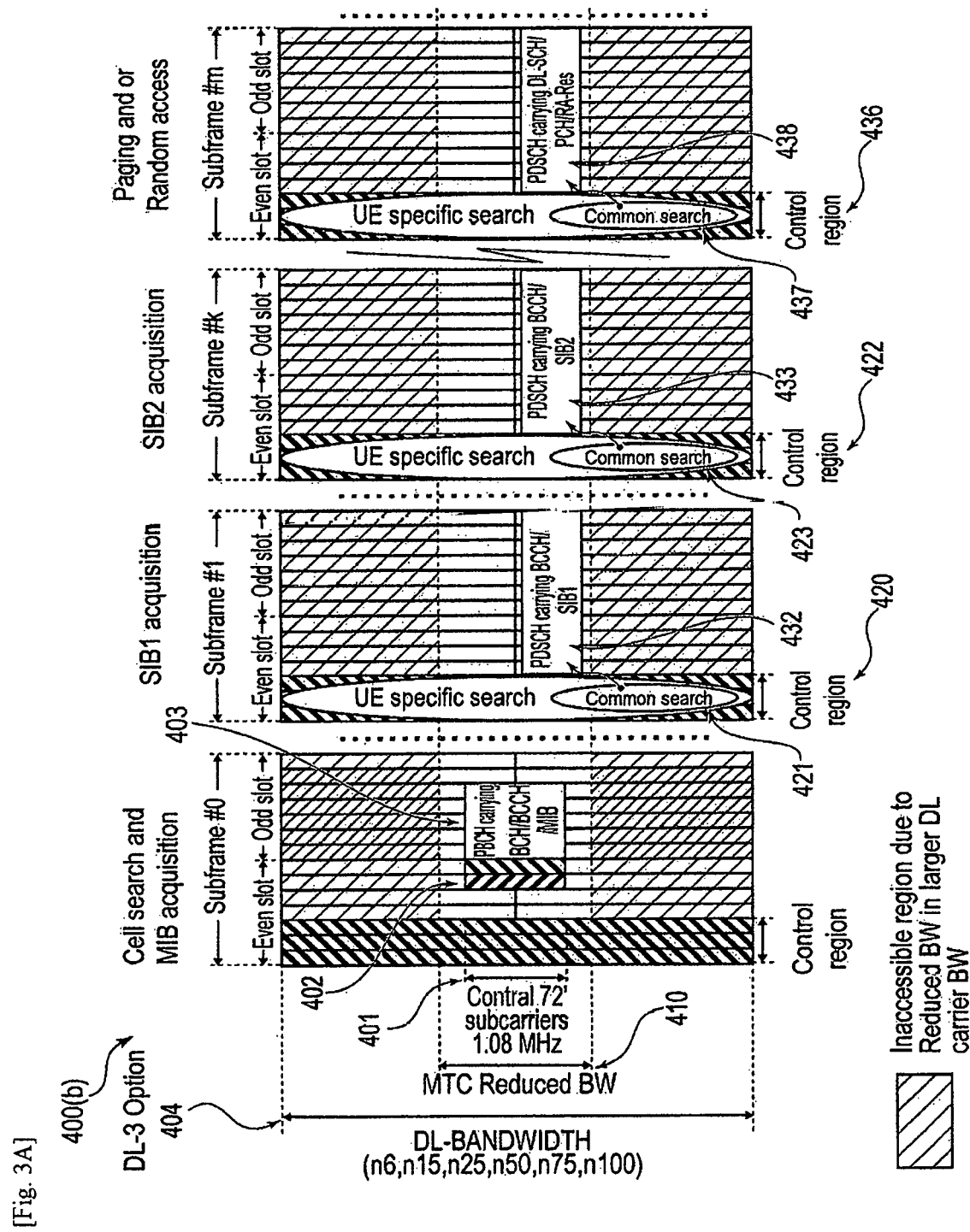

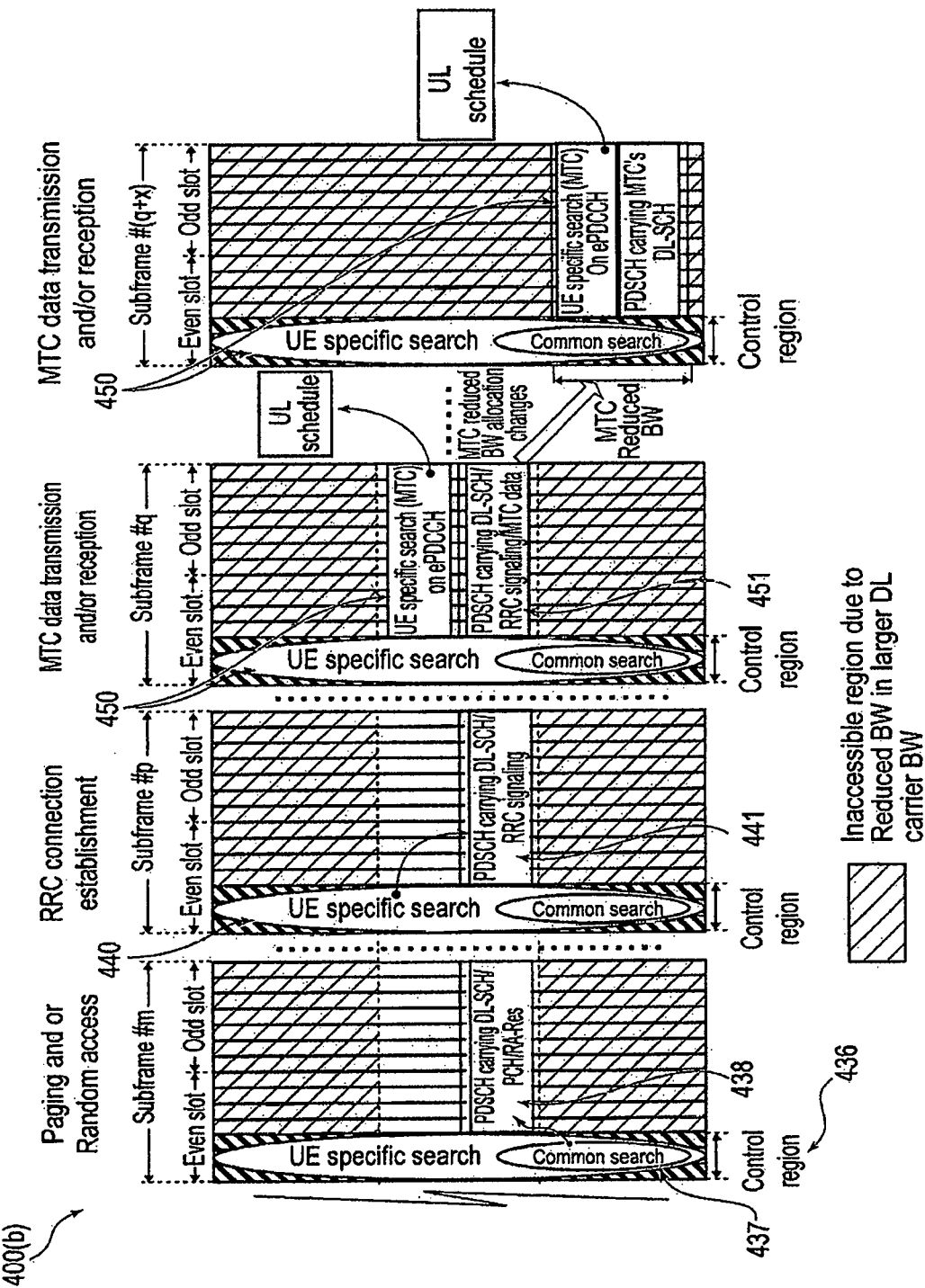

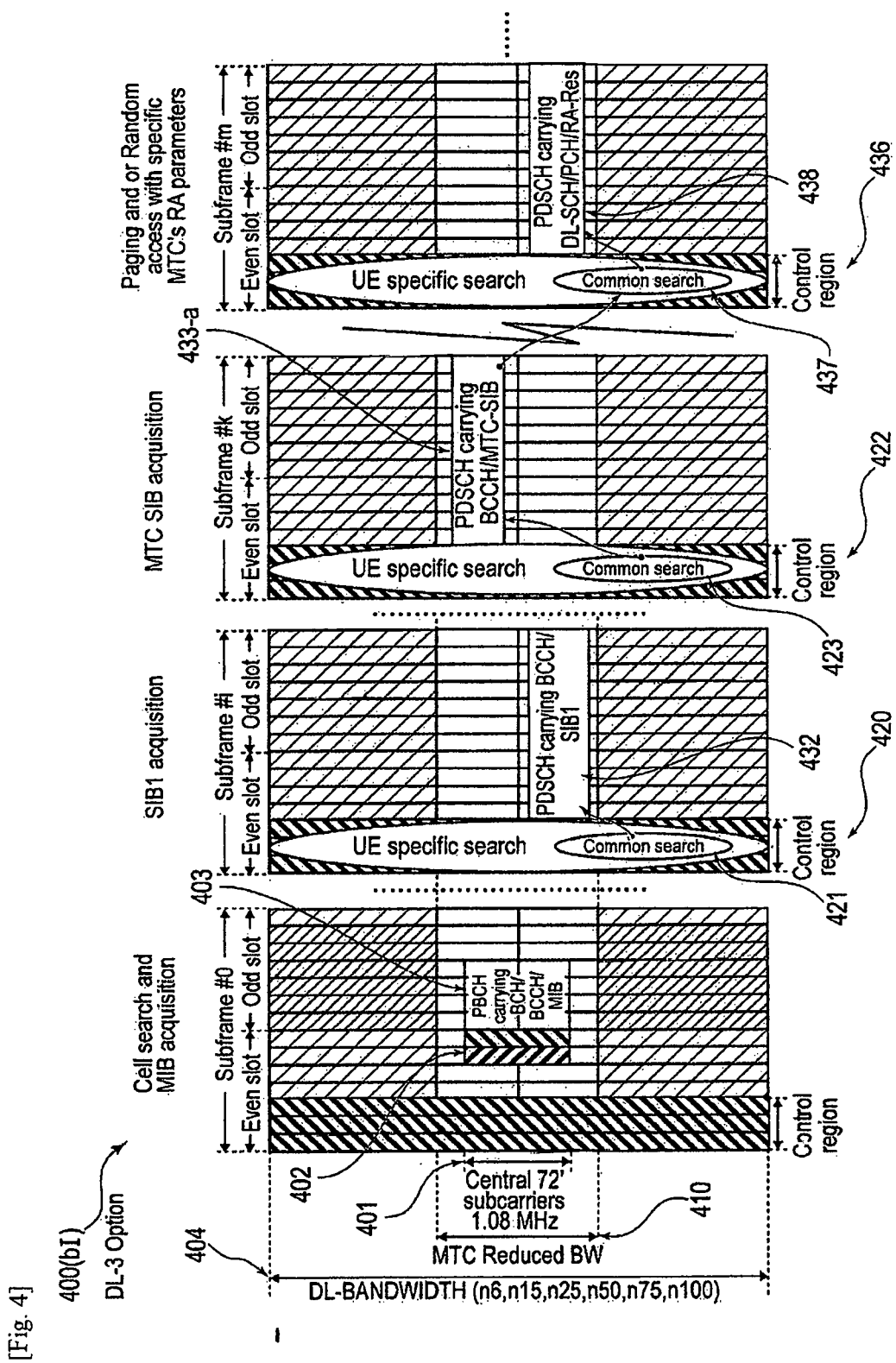

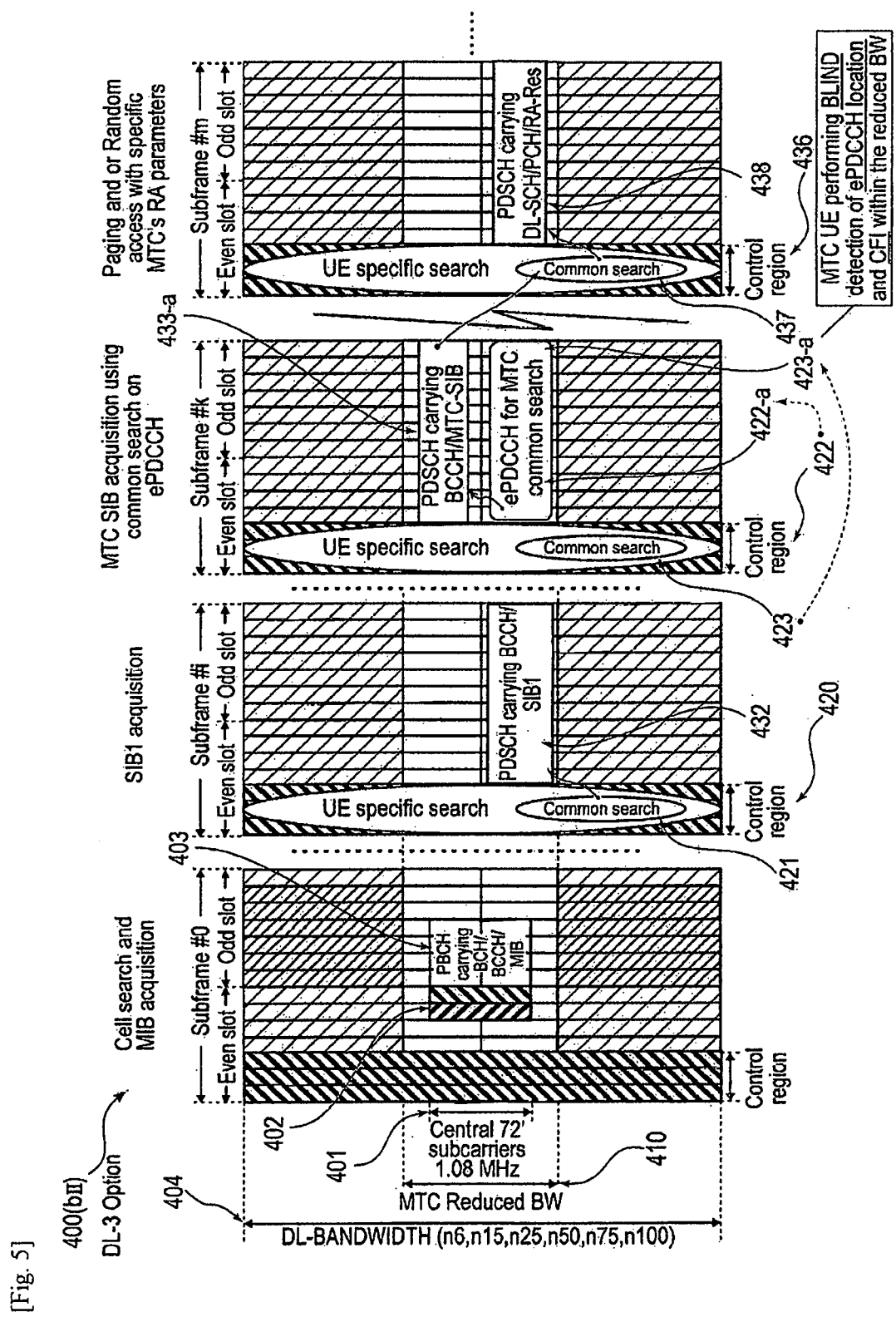

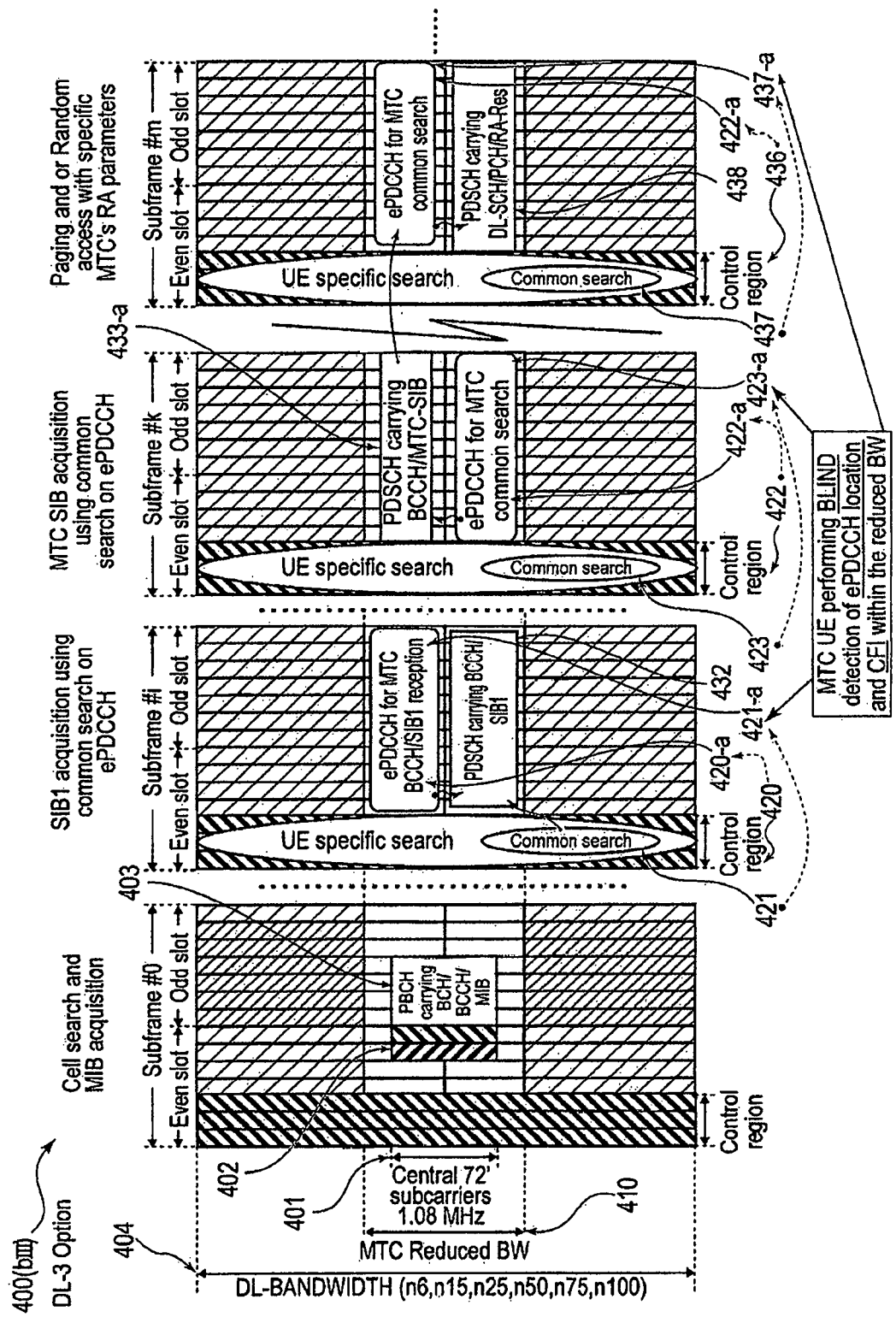

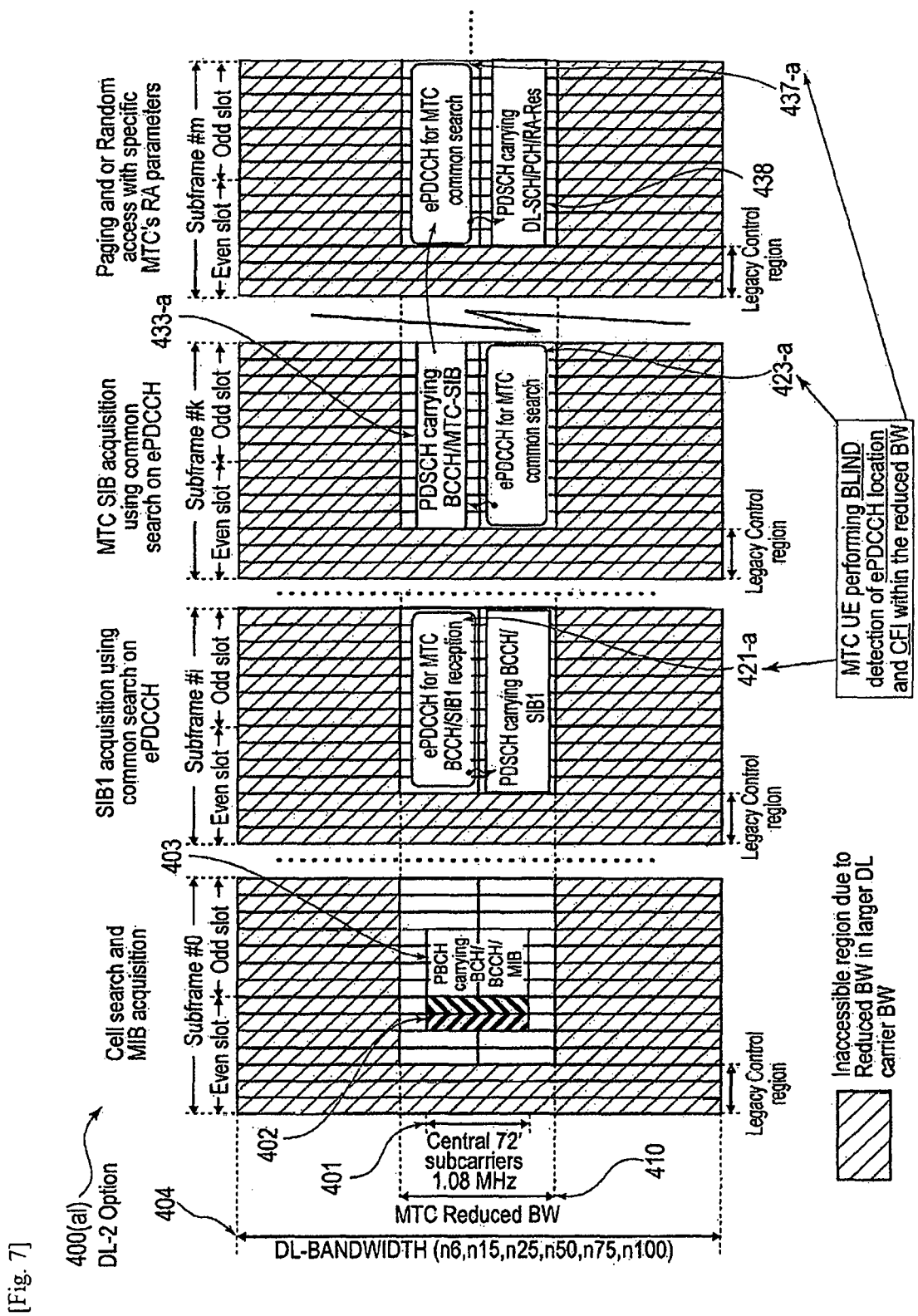

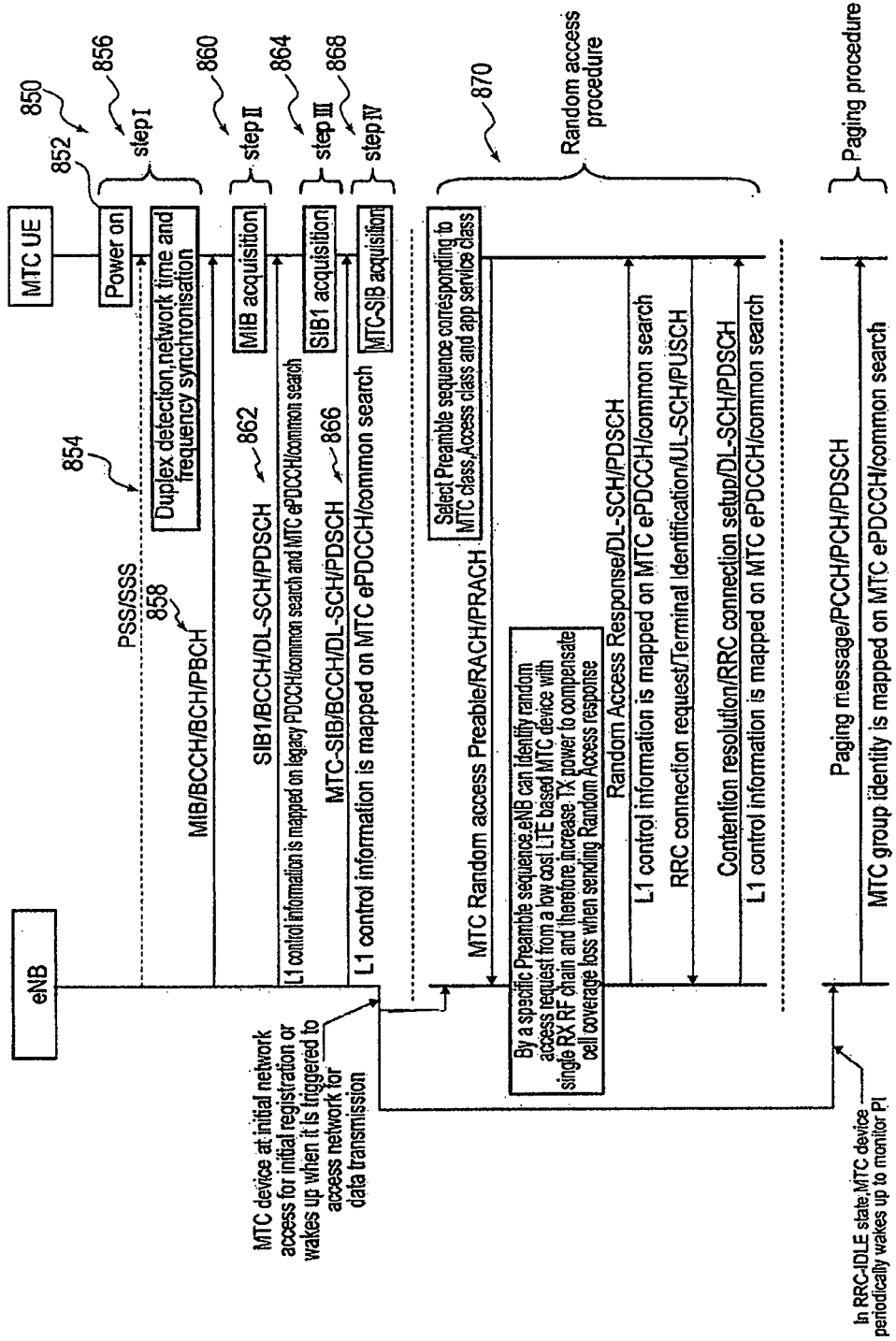

[Fig.9A]
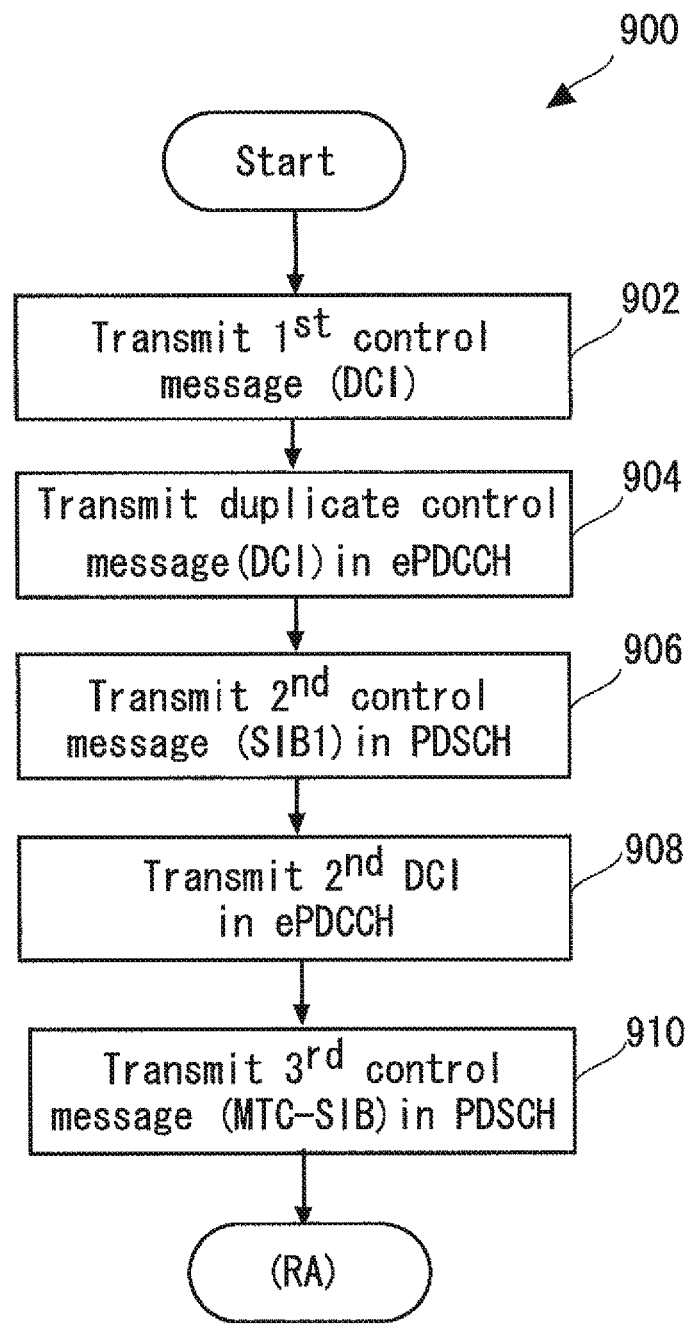

[Fig.9B]
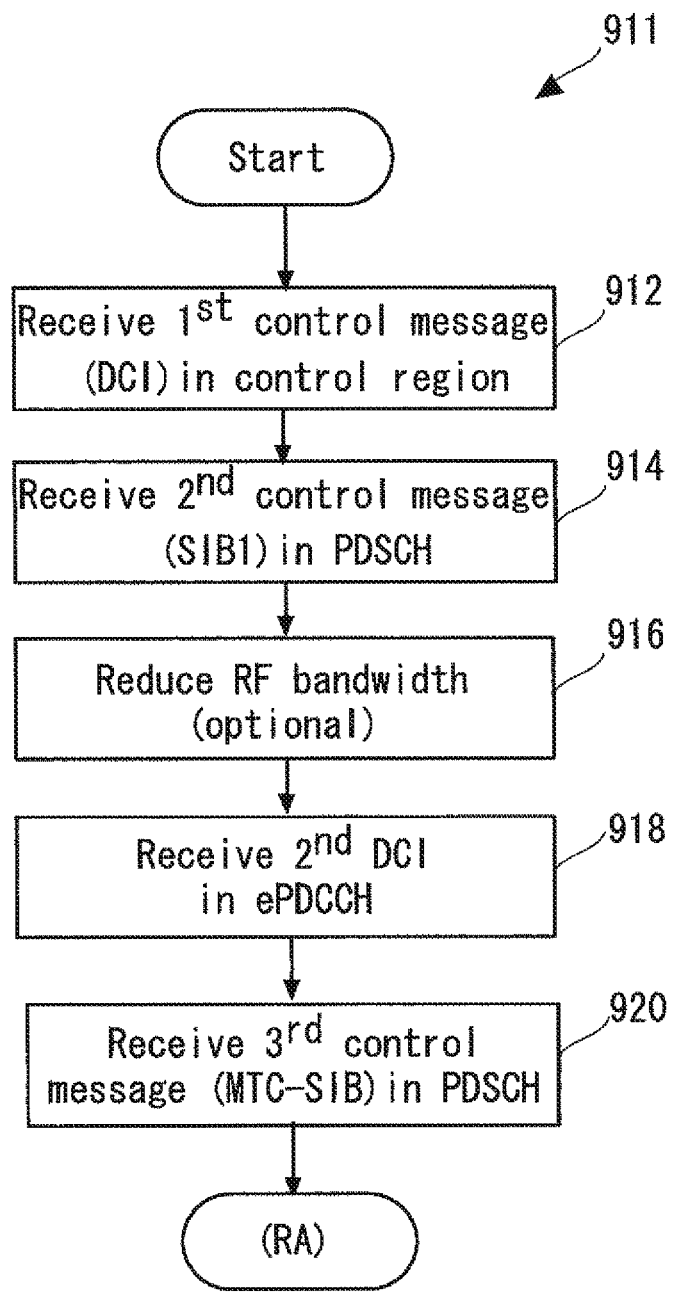

[Fig.9C]
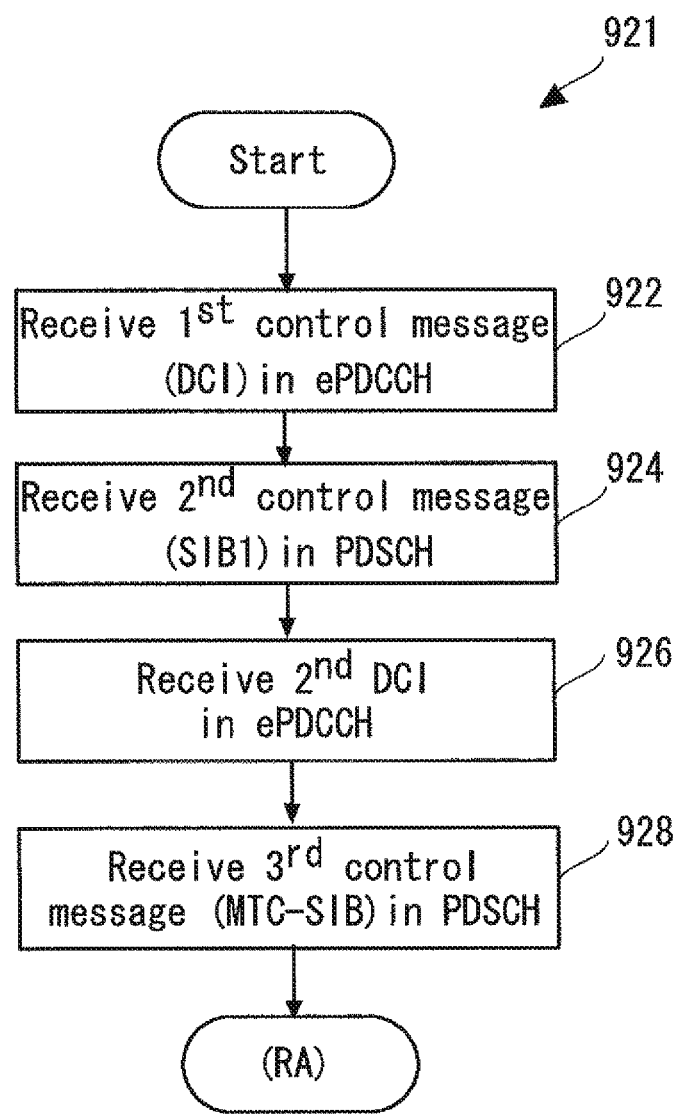

WIRELESS COMMUNICATIONS SYSTEM AND METHOD IN A WIRELESS COMMUNICATIONS SYSTEM

REFERENCE TO RELATED APPLICATION

The present application is a divisional application of U.S. patent application Ser. No. 14/425,082 filed on Mar. 2, 2015, which is a National Stage Entry of international application PCT/JP2013/000725, filed Feb. 8, 2013, which claims the benefit of priority from Australian Patent Application 2012904117 filed on Sep. 21, 2012, the disclosures of all of which are incorporated in their entirety by reference herein.

TECHNICAL FIELD

The invention relates to wireless communications system and method in a wireless communications system.

BACKGROUND ART

Widely deployed wireless voice and data communications systems include multiple-access systems capable of supporting communication with multiple users by sharing the available system resources (e.g. bandwidth and transmit power). Examples include code division multiple access (CDMA) systems, time division multiple access (TDMA) systems, frequency division multiple access (FDMA) systems, GSM/GPRS systems, 3GPP Long Term Evolution (LTE) systems, and orthogonal frequency division multiple access (OFDMA) systems.

Many of these technologies currently coexist in carrier networks, requiring ongoing support of multiple Radio Access Technologies (RATs). Newer and more flexible technologies, such as LTE wireless communication networks are able to support a wide range of legacy applications, however network operators must continue to provide service to devices implementing legacy RATs.

Network operators would like to reduce the cost of overall network maintenance by minimising the number of RATs requiring ongoing deployment and support within their networks. A market experiencing ongoing expansion is that of Machine-to-Machine (M2M in ETSI terminology), or Machine-Type Communications (MTC in 3GPP terminology). MTC involves the automated communication between mechanical or electronic devices, enabling networked machines to exchange information and perform actions without the manual assistance of humans. MTC applications include smart metering, commercial fleet tracking, and so forth.

Many existing MTC devices (e.g. MTC User Equipments) are currently targeted at low-end (e.g. low average revenue per user, low data rate) applications that can be handled adequately by GSM/GPRS networks. Owing to the low cost of these MTC devices and the good coverage of GSM/GPRS, there has been very little motivation for MTC device suppliers to use modules that support the LTE radio interface. Therefore, as more MTC devices of this type are deployed in the wireless communication network, there will be an increased reliance on the existing GSM/GPRS networks. Thus, this will cost network operators not only in terms of maintaining multiple RATs but it will also prevent operators from reaping the maximum benefit out of their spectrum, especially given the non-optimal spectrum efficiency of GSM/GPRS.

According to a recent study [3GPP TR 36.888 v2.0.0 (2012-06), Study on provision of low-cost MTC UEs based on LTE, (Release 11)] the Bill Of Material (BOM) cost of an LTE User Equipment (UE) modem can be reduced to a level comparable with an EGPRS modem by reducing downlink bandwidth to, e.g., 1.4 MHz, reducing peak data rate with transport block size (TBS) restricted to 1000 bits, adopting a single receive RF chain, reducing downlink transmission modes, and adopting half duplex Frequency Division Duplex (FDD).

As the result of the study on provision of low-cost MTC UEs based on LTE, 3GPP RAN-WG1 has recommended that
peak rate reduction and bandwidth reduction be adopted as mandatory techniques,
half duplex FDD be adopted as an optional technique,
single receive RF chain be adopted only if the coverage reduction can be entirely compensated, and
an MTC-specific UE category be introduced.

SUMMARY OF INVENTION

Technical Problem

In particular, adoption of a single receive RF chain technique provides significant cost reduction, specifically when it is combined with peak rate reduction and bandwidth reduction techniques. It is estimated that this will result in up to 56% cost reduction when compared with a Rel'8 LTE CAT1 UE. However, adopting a single receive RF chain will result in a 4 dB degradation to cell coverage according to the RAN-WG1 study result.

There is, accordingly, a need for apparatus and methods for enabling and optimising an MTC system to achieve configurable reduced downlink bandwidth(s) in a larger carrier bandwidth, and for compensating cell coverage loss due to the use of a single receive RF chain. Embodiments of the present invention seek to address these requirements.

Solution to Problem

In one aspect, the invention provides a method in a wireless base station, the method comprising:
transmitting, to a wireless device having a reduced data bandwidth or a reduced control and data bandwidth, control and data signalling within a first bandwidth, in respective control and data regions, wherein signalling within the data region intended for the wireless device is constrained within a second bandwidth which is narrower than the first bandwidth.

In embodiments, the method further comprising:
transmitting, to the wireless device, a first control message within the control region, the first control message comprising location information of a second control message within the data region;
transmitting, to the wireless device, the second control message which comprises scheduling information of a third control message within the data region; and
transmitting, to the wireless device, the third control message which comprises information identifying resources allocated by the wireless base station for use by wireless devices having the reduced bandwidth.

In embodiments, the first control message comprises a first downlink control information (DCI) message located within a common search space of the control region.

In embodiments, the method further comprising transmitting, to the wireless device, a duplicate of the first control message within the data region, the duplicate first control message being configured for blind detection at the wireless device.

In embodiments, the second control message comprises a system information block of a first type, which further comprises cell access information and other system information blocks scheduling information, located within a broadcast control channel (BCCH) of the data region.

In embodiments, the third control message comprises a system information block (SIB) having a type associated with wireless devices having the reduced bandwidth.

In embodiments, the SIB comprises information including one or more of the following attributes:
  downlink reduced bandwidth information;
  uplink carrier frequency and bandwidth information;
  random access parameters information; and
  frame and subframe configuration information.

In embodiments, the step of transmitting the third control message comprises transmitting a second DCI message located within a common search space of the data region, the second DCI message comprising location information of the third control message within the data region.

In embodiments, the common search space of the data region is allocated within one or more enhanced physical downlink control channels (ePDCCHs) which are mapped to one or more physical resource blocks (PRBs) configured by the wireless base station for blind detection at the wireless device.

In one aspect, the invention provides a method in a wireless device having a reduced data bandwidth, the method comprising:
  receiving control and data signalling transmitted by a wireless base station within a first bandwidth in respective control and data regions, the control signalling being received by the wireless device within the first bandwidth, and the data signalling being received by the wireless device within a second bandwidth which is narrower than the first bandwidth.

In embodiments, the method further comprising:
  receiving a first control message within the control region, the first control message comprising location information of a second control message within the data region;
  receiving the second control message which comprises scheduling information of a third control message within the data region; and receiving the third control message which comprises information identifying resources allocated by the wireless base station for use by wireless devices having the reduced bandwidth.

In one aspect, the invention provides a method in a wireless device having a reduced bandwidth, the method comprising:
  receiving control and data signalling transmitted by a wireless base station within a first bandwidth in respective control and data regions, the control and data signalling being received by the wireless device within a second bandwidth which is narrower than the first bandwidth.

In embodiments, the method further comprising:
  receiving a first control message within the data region, the first control message comprising location information of a second control message within the data region;
  receiving the second control message which comprises scheduling information of a third control message within the data region; and
  receiving the third control message which comprises information identifying resources allocated by the wireless base station for use by wireless devices having the reduced bandwidth.

In embodiments, the method which comprises performing blind detection of the first control message which comprises a first downlink control information (DCI) message located within one or more enhanced physical downlink control channels (ePDCCHs).

In one aspect, the invention provides a wireless base station for communicating with a wireless device having a reduced data bandwidth or a reduced control and data bandwidth, the wireless base station comprising:
  a transmitter to transmit control and data signalling within a first bandwidth, in respective control and data regions, wherein signalling within the data region intended for the wireless device is constrained within a second bandwidth which is narrower than the first bandwidth.

In embodiments, the wireless base station further comprising:
  a communications processor configured to:
  transmit, to the wireless device, a first control message within the control region, the first control message comprising location information of a second control message within the data region;
  transmit, to the wireless device, the second control message which comprises scheduling information of a third control message within the data region; and
  transmit, to the wireless device, the third control message which comprises information identifying resources allocated by the wireless base station for use by wireless devices having the reduced bandwidth.

In one aspect, the invention provides a wireless user equipment (UE) having a reduced data bandwidth, the wireless UE comprising:
  a receiver to receive control and data signalling transmitted by a wireless base station within a first bandwidth in respective control and data regions, the control signalling being received by the wireless device within the first bandwidth, and the data signalling being received by the wireless device within a second bandwidth which is narrower than the first bandwidth.

In embodiments, the wireless UE further comprising:
  a communications processor configured to:
  receive a first control message within the control region, the first control message comprising location information of a second control message within the data region;
  receive the second control message which comprises scheduling information of a third control message within the data region; and
  receive the third control message which comprises information identifying resources allocated by the wireless base station for use by wireless devices having the reduced bandwidth.

In one aspect, the invention provides a wireless user equipment (UE) having a reduced bandwidth, the wireless UE comprising:
  a receiver to receive control and data signalling transmitted by a wireless base station within a first bandwidth in respective control and data regions, the control and data signalling being received by the wireless device within a second bandwidth which is narrower than the first bandwidth.

In embodiments, the wireless UE further comprising:
  a communications processor configured to:
  receive a first control message within the data region, the first control message comprising location information of a second control message within the data region;
  receive the second control message which comprises scheduling information of a third control message within the data region; and receive the third control message which comprises information identifying resources allocated by the wireless base station for use by wireless devices having the reduced bandwidth.

In embodiments, the communications processor is configured to perform blind detection of the first control message which comprises a first downlink control information (DCI) message located within one or more enhanced physical downlink control channels (ePDCCHs).

In one aspect, the invention provides a method implemented in a wireless communications system, the method comprising:

transmitting, from a wireless base station to a wireless device having a reduced data bandwidth or a reduced control and data bandwidth, control and data signalling within a first bandwidth, in respective control and data regions, wherein signalling within the data region intended for the wireless device is constrained within a second bandwidth which is narrower than the first bandwidth.

In one aspect, the invention provides a wireless communications system comprising:

a wireless device having a reduced data bandwidth or a reduced control and data bandwidth; and a base station to transmit, to the wireless device, control and data signalling within a first bandwidth, in respective control and data regions, wherein signalling within the data region intended for the wireless device is constrained within a second bandwidth which is narrower than the first bandwidth.

In one aspect, the invention provides a method in a wireless base station, the method comprising:

transmitting, to a wireless device having a reduced data bandwidth option or a reduced control and data bandwidth option, control and data signalling within a first bandwidth, in respective control and data regions, wherein signalling within the data region intended for the wireless device is constrained within a second bandwidth which is narrower than the first bandwidth;

transmitting, to the wireless device, a first control message within the control region, the first control message comprising location information of a second control message within the data region;

transmitting, to the wireless device, the second control message which comprises scheduling information of a third control message within the data region; and transmitting, to the wireless device, the third control message which comprises information identifying resources allocated by the wireless base station for use by wireless devices having a reduced bandwidth option.

In embodiments, the first control message comprises a first Downlink Control Information (DCI) message located within a common search space of the control region.

The method may further comprise transmitting, to the wireless device, a duplicate of the first control message within the data region, the duplicate first control message being configured for blind detection at the wireless device.

In embodiments, the second control message comprises a system information block of a first type, which further comprises cell access information and cell selection information, located within a Broadcast Control Channel (BCCH) of the data region.

In embodiments, the third control message comprises a System Information Block (SIB) having a type associated with wireless devices having a reduced bandwidth option. The SIB may comprise information including one or more of the following attributes:

downlink reduced bandwidth information;
uplink carrier frequency and bandwidth information;
random access parameters information; and
frame and subframe configuration information.

The step of transmitting the third control message comprises, in some embodiments of the invention, transmitting a second DCI message located within the common search space of the control region, the second DCI message comprising location information of the third control message within the data region.

Transmitting the third control message, in some embodiments of the invention, comprises transmitting a second DCI message located within a common search space of the data region, the second DCI message comprising location information of the third control message within the data region.

The common search space of the data region may be allocated within one or more enhanced Physical Downlink Control Channels (ePDCCHs). In embodiments, the one or more ePDCCHs are mapped to one or more Physical Resource Blocks (PRBs) configured by the wireless base station for blind detection at the wireless device.

In another aspect, the invention provides a method in a wireless device having a reduced data bandwidth option, the method comprising:

receiving, at the wireless device, control and data signalling transmitted by a wireless base station within a first bandwidth in respective control and data regions, the control signalling being received by the wireless device within the first bandwidth, and the data signalling being received by the wireless device within a second bandwidth which is narrower than the first bandwidth;

receiving, at the wireless device, a first control message within the control region, the first control message comprising location information of a second control message within the data region;

receiving, at the wireless device, the second control message which comprises scheduling information of a third control message within the data region; and receiving, at the wireless device, the third control message which comprises information identifying resources allocated by the wireless base station for use by wireless devices having a reduced bandwidth option.

In embodiments, the first control message comprises a first Downlink Control Information (DCI) message located within a common search space of the control region.

In embodiments, the second control message comprises a System Information Block (SIB) of a first type further comprising cell access information and cell selection information, located within a Broadcast Control Channel (BCCH) of the data region.

The third control message may comprise a SIB having a type associated with wireless devices having a reduced bandwidth option.

In some embodiments, receiving the third control message comprises receiving a second DCI message located within the common search space of the control region, the second DCI message comprising location information of the third control message within the data region.

In some embodiments, receiving the third control message comprises receiving a second DCI message located within a common search space of the data region, the second DCI message comprising location information of the third control message within the data region.

The common search space of the data region may be allocated within enhanced Physical Downlink Control Channels (ePDCCHs). In embodiments, the one or more ePDCCHs are mapped to one or more Physical Resource Blocks (PRBs) configured by the wireless base station for blind detection at the wireless device.

In a further aspect, the invention provides a method in a wireless device having a reduced control and data bandwidth option, the method comprising:

receiving, at the wireless device, control and data signalling transmitted by a wireless base station within a first bandwidth in respective control and data regions, the control and data signalling being received by the wireless device within a second bandwidth which is narrower than the first bandwidth;

receiving, at the wireless device, a first control message within the data region, the first control message comprising location information of a second control message within the data region;

receiving, at the wireless device, the second control message which comprises scheduling information of a third control message within the data region; and receiving at the wireless device, the third control message which comprises information identifying resources allocated by the wireless base station for use by wireless devices having a reduced bandwidth option.

In embodiments, the step of receiving the first control message comprises performing blind detection of the first control message which comprises a first Downlink Control Information (DCI) message located within enhanced Physical Downlink Control Channels (ePDCCHs).

The second control message may comprise a System Information Block (SIB) of a first type comprising cell access information and cell selection information, located within a Broadcast Control Channel (BCCH) of the data region.

In embodiments, the third control message comprises a SIB having a type associated with MTC wireless devices having a reduced bandwidth option.

In embodiments, receiving the third control message comprises receiving a second DCI message located within a common search space of the data region, the second DCI message comprising location information of the third control message within the data region.

The common search space of the data region may be located within an ePDCCH(s). In embodiments, the ePDCCH(s) is mapped to one or more Physical Resource Blocks (PRBs) configured by the wireless base station for blind detection at the wireless device.

In another aspect the invention provides an apparatus in a wireless base station for communicating with a wireless device having a reduced data bandwidth option or a reduced control and data bandwidth option, the apparatus comprising:

a transmitter operable to transmit control and data signalling within a first bandwidth, in respective control and data regions, wherein signalling within the data region intended for the wireless device is constrained within a second bandwidth which is narrower than the first bandwidth;

a communications processor operably associated with the transmitter and configured to:

generate and transmit, to the wireless device via the transmitter, a first control message within the control region, the first control message comprising location information of a second control message within the data region;

generate and transmit, to the wireless device via the transmitter, the second control message which comprises scheduling information of a third control message within the data region; and generate and transmit, to the wireless device via the transmitter, the third control message which comprises information identifying resources allocated by the wireless base station for use by wireless devices having a reduced bandwidth option.

In yet another aspect the invention provides a wireless User Equipment (UE) apparatus having a reduced data bandwidth option, the apparatus comprising:

a receiver operable to receive control and data signalling transmitted by a wireless base station within a first bandwidth in respective control and data regions, the control signalling being received by the wireless device within the first bandwidth, and the data signalling being received by the wireless device within a second bandwidth which is narrower than the first bandwidth;

a communications processor operably associated with the receiver and configured to:

receive and process a first control message within the control region, the first control message comprising location information of a second control message within the data region;

receive and process the second control message which comprises scheduling information of a third control message within the data region; and receive and process the third control message which comprises information identifying resources allocated by the wireless base station for use by wireless devices having a reduced bandwidth option.

In a still further aspect the invention provides a wireless User Equipment (UE) apparatus having a reduced bandwidth option, the apparatus comprising:

a receiver operable to receive control and data signalling transmitted by a wireless base station within a first bandwidth in respective control and data regions, the control and data signalling being received by the wireless device within a second bandwidth which is narrower than the first bandwidth;

a communications processor operably associated with the receiver and configured to:

receive and process a first control message within the data region, the first control message comprising location information of a second control message within the data region;

receive and process the second control message which comprises scheduling information of a third control message within the data region; and receive and process the third control message which comprises information identifying resources allocated by the wireless base station for use by wireless devices having a reduced bandwidth option.

Further features, benefits and advantages of the invention will be apparent to the skilled person from the following description of embodiments, which is provided by way of example only, and should not be understood to limit the scope of the invention as defined in any of the preceding statements, or in the attached claims.

Advantageous Effects of Invention

According to the present invention, it is possible to provide a system and a method to achieve configurable reduced downlink bandwidth in a larger carrier bandwidth.

BRIEF DESCRIPTION OF DRAWINGS

FIG. 1 illustrates an exemplary wireless communication network supporting both legacy LTE UE(s) and low-cost MTC UE(s) embodying the invention.

FIG. 2 illustrates an exemplary LTE air-interface and possible network access stage for LTE-based MTC devices with a reduced downlink (DL) control and data bandwidth (BW) option.

FIG. 3A illustrates an exemplary LTE air-interface and possible network access stage for LTE based MTC devices with a reduced downlink (DL) data bandwidth (BW) option.

FIG. 3B illustrates an exemplary LTE air-interface and possible network access stage for LTE based MTC devices with a reduced downlink (DL) data bandwidth (BW) option.

FIG. 4 illustrates another exemplary LTE air-interface and possible network access stage for LTE based MTC devices with a reduced downlink (DL) data bandwidth (BW) option, according to an embodiment of the invention.

FIG. 5 illustrates a third exemplary LTE air-interface and possible network access stage for LTE based MTC devices with a reduced downlink (DL) data bandwidth (BW) option, according to an embodiment of the invention.

FIG. 6 illustrates a fourth exemplary LTE air-interface and possible network access stage for LTE based MTC devices with a reduced downlink (DL) data bandwidth (BW) option, according to an embodiment of the invention.

FIG. 7: illustrates a fifth exemplary LTE air-interfaces and possible network access stage for LTE based MTC devices with a reduced downlink (DL) control and data bandwidth (BW) option, according to an embodiment of the invention.

FIG. 8 shows a message sequence chart (MSC) corresponding to an access procedure embodying the invention.

FIG. 9A is flowchart illustrating method of operating a wireless base station according to embodiments of the invention.

FIG. 9B is flowchart illustrating method of operating a wireless device according to embodiments of the invention.

FIG. 9C is flowchart illustrating method of operating a wireless device according to embodiments of the invention.

DESCRIPTION OF EMBODIMENTS

Embodiments of the invention will now be described with reference to the accompanying drawings, in which like reference numerals refer to like features.

FIG. 1 is a schematic diagram illustrating an exemplary communication network 1000 supporting MTC devices 100.

The communication network 1000 comprises a mobile communication network supporting legacy LTE UEs (e.g. wireless devices such as mobile phones, smart phones, laptop computers, and so forth, used for voice and data communication by human users), and MTC UEs 100 embodying the present invention. Such MTC UEs are defined in the 3GPP standards as devices engaging in data communications involving one or more entities which do not necessarily need human interaction, and which therefore generate a specific type of wireless communication network traffic.

The network 1000 includes an LTE core network 500 which connects to external IP network 800. The external IP network 800 provides connectivity from the mobile communication network to one or more external MTC servers 600 and/or one or more MTC application servers 700. MTC servers, e.g. server 550 internal to the LTE network 500, or server 600 external to the core network, provide MTC communication service to MTC devices such as low cost LTE based MTC devices 100. The MTC application server 700 is responsible for providing application services to MTC devices 100.

The network 1000 further comprises multiple enhanced Node B (eNB) base stations 300 which interconnect with the mobile communication core network 500 to provide wireless connectivity and access to LTE based wireless terminals.

A legacy UE, such as a Rel'8 LTE UE CAT#1 having dual received RF chains as default, may have cell coverage 250 as illustrated.

A low cost LTE based MTC device 100 embodying the invention employs BW reduction, peak rate reduction and a single received RF chain, advantageously resulting in a reduced BOM cost. As the result of having only a single received RF chain, a low cost LTE based MTC device 100 may have a reduced cell coverage 150, as indicated in FIG. 1.

Embodiments of the present invention provide methods for enhancing design and system of the air interface 400 in such a way that the single Rx RF chain MTC devices 100 shall obtain cell coverage 151 which is the same as, or similar to, the legacy Rel'8 LTE UE CAT#1 200. Furthermore, embodiments of the invention enable a reduced bandwidth especially MTC communications option to be realised without significant impact on the existing 3GPP LTE standard specifications.

FIG. 2 illustrates schematically 400(a) an exemplary LTE air-interface and possible network access stage for LTE-based MTC devices with a reduced DL control and data BW option (DL-2).

According to the prior art LTE specifications (Rel'8, Rel'9, Rel'10 and Rel'11), a low cost LTE based MTC device with DL-2 option is able to:

be powered up, perform network time and frequency synchronisation using the Primary Synchronisation Signal (PSS) and Secondary Synchronisation Signal (SSS) 402, and perform Physical Broadcast Channel (PBCH) reception and Broadcast Channel (BCH) decoding for the reception of the Broadcast Control Channel/Master Information Block (BCCH/MIB) 403.

Having completed these steps, the low cost LTE based MTC device with DL-2 option will know the carrier DL-BW 404 (although it will not be capable of accessing this full BW). However it will not:

know the MTC reduced BW 410 setting unless the MTC reduced BW is predefined and fixed in the centre of the carrier bandwidth, be able to acquire System Information Blocks (SIBs) for further radio network procedures, because it cannot access the full carrier BW to perform Control Format Indicator (CFI) detection, nor can it perform common search on Physical Downlink Control Channels (PDCCHs) in the control region 420 for the reception of a Physical Downlink Shared Channel (PDSCH) carrying DL-SCH/BCCH/SIB(s); or be able to utilise an LTE Rel'11 enhanced PDCCH (ePDCCH) because Rel'11 ePDCCH is designed for UE specific search, and at this stage a LTE based MTC device with DL-2 option is unable to obtain information on the location of ePDCCH PRB within the reduced BW.

Embodiments of the invention, as described below with reference to FIGS. 4 to 8, seek to overcome the above limitation of the LTE based MTC device with DL-2 option.

Turning now to FIGS. 3A and 3B, there is shown schematically 400(b) an exemplary LTE air-interface and possible network access stage for LTE based MTC devices with a reduced DL data BW option (DL-3). This option provides reduced bandwidth for the data channel in baseband only, while the control channels are still allowed to use the full carrier DL bandwidth 404.

According to the prior art LTE specifications (Rel'8, Rel'9, Rel'10 and Rel'11), a low cost LTE based MTC device with DL-3 option is able to:

- be powered up,
- perform network time and frequency synchronisation using PSS and SSS 402,
- perform PBCH reception and BCH decoding for the reception of the BCCH/MIB 403;
- detect CFI and determine the control region 420 on the DL carrier BW 404, and perform common search on PDCCH(s) 421 for reception of associated PDSCH/DL-SCH/BCCH/SIB1 432; and
- detect CFI and determine the control region 422 on the DL carrier bandwidth 404, and perform common search on PDCCH(s) 423 for the reception of associated PDSCH/DL-SCH/BCCH/SIB2 433.

However, during the reception of the SIB1 and/or SIB2, the eNB 300 is unable to distinguish a low cost LTE based MTC device with a single Rx RF chain (100) from a legacy LTE UE 200. Therefore, the link performance on the demodulation of PDSCH/DL-SCH carrying BCCH/SIB(s) will be compromised. However, the performance in the reception of PDSCH/DL-SCH carrying BCCH/SIB(s) can be compensated due to the repetition of SIB(s) messages.

Having completed these steps, the low cost LTE based MTC device with DL-3 option will:

- know the carrier DL-BW 404,
- know the MTC reduced BW 410 setting, and
- have random access/paging parameter(s) for further performing common search on PDCCH(s) using the Paging Radio Network Temporary Identifier (P-RNTI) and/or Random Access RNTI (RA-RNTI) 437 in the detected control region 436 for the reception of PDSCH/DL-SCH carrying PCH or Random Access Respond (RA-Res) 441.

However, During the paging and/or random access procedure mentioned above, the eNB 300 will not be able to distinguish a low cost LTE based MTC device(s) with a single Rx RF chain 100 from a legacy LTE UE 200. Therefore, the reception of PDSCH/DL-SCH carrying PCH or RA-Res 441 shall be compromised at low cost LTE based MTC device(s) with a single Rx RF chain 100, resulting in performance degradation and failure in paging/random access procedure.

Additionally, the degradation in link performance shall result in further attempts, making a LTE based MTC device consume more power and reducing battery life. Clearly, this is contrary to the objectives of developing low cost LTE based MTC devices.

Embodiments of the invention thus seek to create a system and procedure to assist the eNB 300 to identify a low cost LTE based MTC device with a single Rx RF chain 100 during the initial random access procedure. The eNB 300 can then adjust the transmit power on the PDSCH/DL-SCH carrying RA-Res. Thus, cell coverage (151) during the random access procedure of a single Rx RF chain LTE based MTC devices 100 can be controlled and compensated by eNB 300.

FIG. 4 illustrates schematically 400(*bI*) an exemplary LTE air-interface and network access stage for LTE based MTC devices with a reduced DL data BW option DL-3, according to one embodiment of the invention. The embodiment 400(*bI*) introduces a 'System Information Block for MTC communication' 433-*a*, also referenced herein as MTC-SIB or SystemInformationBlockType14. This MTC-SIB 433-*a* is a new SIB type, additional to the existing 3GPP 13 SIB types specified in 3GPP TS 36.331.

The newly introduced Information Element (IE) MTC-SIB 433-*a* embodying the invention contains the required information, comprising the following key attributes:

- DL reduced BW information for MTC communication.
- UL carrier frequency and bandwidth information,
- MTC random access parameters information.
- MTC frame and subframe configuration information.

The DL reduced BW information enables the introduction of MTC-specific UE sub categories, i.e. low end MTC-UE category (e.g. low data rate) and high end MTC-UE category (e.g. high data rate). This information also enables the eNB 300 to dynamically and conditionally adjust the radio resources for MTC on a radio frame basis, The MTC random access parameters information allows the eNB 300 to distinguish random access requests from MTC devices 100 and from LTE UE (non MTC devices) 200. This also allows the eNB 300 to distinguish random access request from MTC device(s) of different access classes or services and hence the eNB is able to detect demand rate in random access requests per service class, and then to perform dynamic random access resource allocation accordingly.

The MTC frame and subframe configuration information allows the eNB 300 to independently adjust the UL and/or DL resource for MTC communication on a radio frame basis.

The introduction of IE MTC-SIB 433-*a* further require modification of the legacy SystemInformationBlockType1, i.e SIB1 432, to include scheduling information of the newly introduced MTC-SIB 433-*a* i.e. SystemInformationBlockType14. Advantageously, this modification may be performed by replacing the "spare5" in the "SIB-Type" with "sibType14" to represent the newly introduced IE MTC-SIB 433-*a*. The modification shall make the attribute 'SIB-Type' appears as illustrated:

```
"SIB-Type ::=   ENUMERATED {
                    sibType3, sibType4, sibType5, sibType6,
                    sibType7, sibType8, sibType9, sibType10,
                    sibType11, sibType12-v920, sibType13-v920,
                sibType14,
                    spare4, spare3, spare2, spare1, ...}"
```

Referring again to the schematic 400 (*bI*) in FIG. 4, the access procedure, according to this embodiment of the invention, for LTE based MTC devices with reduced peak rate, reduced bandwidth and single Rx RF chain is described according to the following steps.

1. At power on, an LTE based MTC device 100 performs frequency, symbol, and time synchronisation and determines cell identity using PSS and SSS 402 on fixed 1.4 MHz bandwidth 401.
2. Upon success of frequency, symbol, and time synchronisation and cell identity determination in step 1 above, the LTE based MTC device 100 shall perform the reception and decoding of PBCH/BCH/BCCH carrying MIB 403.
3. On the completion of MIB acquisition in step 2 above, the LTE based MTC device 100 has acquired information on carrier DL-BW 404. The low cost LTE based MTC device 100 with reduced BW option DL-3 then performs reception of the Physical Control Format Indicator Channel (PCFICH) for CFI detection to determine the control region 420 on the carrier DL-BW, and perform common search 421 to determine the control information for the reception of PDSCH/DL-SCH/BCCH carrying SIB1 432.

4. On the completion of SIB1 acquisition in step 3, a low cost LTE based MTC device 100 with reduced BW option DL-3 has acquired information for evaluating if it is allowed to access a cell and determining the scheduling information of MTC-SIB.

If the LTE based MTC device 100 is allowed to access a cell, it uses the MTC-SIB scheduling information to determine the frame and subframe in which it shall perform PCFICH reception on the carrier DL-BW for CFI detection to determine the control region 422, and perform the common search 423 to determine the control information for the reception of PDSCH/DL-SCH carrying MTC-SIB (433-a)

Upon the successful of MTC-SIB 433-a acquisition, the low cost LTE based MTC device 100 with reduce BW option DL-3 is now has information on cell MTC allocated resources, and random access resources. This includes information that the device 100 can use in initial random access process to assist the eNB 300 to recognize its single Rx RF chain capability and MTC service class hence eNB 300 shall be able to compensate the cell coverage degradation in DL due to single Rx RF chain.

A further embodiment of the present invention introduces a 'common search' on the ePDCCH 422-a, as illustrated in FIG. 5. This enables detection of the control information for reception, demodulation and decoding of the associated PDSCH/DL-SCH carrying the MTC-SIB 433-a by a low cost LTE based MTC device 100 with reduced BW option DL-3.

In this embodiment, an ePDCCH carrying control information for reception, demodulation and decoding of the associating PDSCH/DL-SCH/MTC-SIB is mapped on one or more Physical Resource Blocks (PRBs) within the predefined reduced bandwidth for MTC access.

At the MTC system information (MTC-SIB) acquisition state, within the reduced bandwidth, a low cost LTE based MTC device 100 is required to perform blind detection to locate the PRB or PRBs to which the ePDCCH(s) control information for the reception, demodulation and decoding of the associating PDSCH/DL-SCH/MTC-SIB is mapped to by eNB 300.

In reference again to FIG. 5, there is shown a schematic 400 (bII), 5 illustrating a third exemplary LTE air-interface and possible network access stage for LTE based MTC devices with a reduced DL data bandwidth BW option. As the result of introducing common search on the ePDCCH, blind detection of PRB(s) carrying ePDCCH, blind detection of number of ePDCCHs transmit antenna and blind detection of CFI, the access procedure for low cost LTE based MTC device(s) 100 with reduced peak rate, reduced bandwidth option DL-3 and single Rx RF chain is described in this embodiment according to the following steps.

1. At power on, a low cost LTE based MTC device 100 with reduced BW option DL-3 performs frequency, symbol, and time synchronisation, and determines cell identity using PSS and SSS 402 on the fixed 1.4 MHz bandwidth 401 as in the first embodiment.
2. Upon the success of frequency, symbol, and time synchronisation and cell identity determination in step (1) above, a low cost LTE based MTC device 100 with reduced BW option DL-3 performs reception and decoding of PBCH/BCH/BCCH carrying MIB 403 as in the first embodiment,
3. On the completion of MIB acquisition in step (2), the low cost LTE based MTC device 100 with reduced BW option DL-3 has acquired information on carrier DL-BW information 404. The low cost LTE based MTC device 100 with reduced BW option DL-3 then performs PCFICH reception on the carrier DL-BW for CFI to determine the control region 420, and performs common search 421 to determine the control information for the reception of associating PDSCH/DL-SCH/BCCH carrying SIB1 432, as in the first embodiment.
4. On the completion of SIB1 acquisition in step (3) above, the low cost LTE based MTC device 100 with reduced BW option DL-3 has acquired information for evaluating whether it is allowed to access a cell and determining the scheduling of the MTC-SIB (433-a). If the LTE based MTC device 100 is allowed to access the cell, it uses the MTC-SIB scheduling information to determine frame and subframe in which it:
    4.1. performs blind detection of PRB or PRBs carrying ePDCCH(s) and performs blind detection of CFI 422-a on the reduced DL-BW to determine the control region 422, and
    4.2. performs common search 423-a to determine the control information for the reception of associating PDSCH/DL-SCH carrying MTC-SIB 433-a.

Upon successful of MTC-SIB 433-a acquisition, the low cost LTE based MTC device 100 with reduce BW option DL-3 has information on cell MTC allocated resources, and random access resources including information that it can use in an initial random access process to assist the eNB 300 to recognize its single Rx RF chain capability and MTC service class. Thus the eNB 300 will be able to compensate the cell coverage degradation in DL due to single Rx RF chain.

As will be appreciated from the foregoing description, step (4) differentiates the second embodiment from the first embodiment described with reference to FIG. 4. From this step onward, a low cost LTE based MTC device 100 with reduce BW option DL-3 is able to operate entirely within an assigned reduced DL BW for both control and data channels using the common search and or UE specific search on ePDCCH with blind detection feature as described above.

Additionally, the common search on ePDCCH with blind detection feature enables dynamic allocation of reduced BW for the MTC 100 on any portion of the DL carrier BW.

A still further embodiment of the invention includes the provision of common search on ePDCCH 421-a, as shown in FIG. 6. This enables detection of the control information for reception, demodulation and decoding of the associated PDSCH/DL-SCH carrying SIB1 432 by an LTE based MTC device 100.

In accordance with this embodiment, the access procedure for an LTE based MTC device 100 with reduced peak rate, reduced bandwidth and single Rx RF chain is described according to the following steps.

1. At power on, the low cost LTE based MTC device 100 with reduced BW option DL-3 shall perform frequency, symbol, and time synchronisation and determine cell identity using PSS and SSS 402 on the fixed 1.4 MHz bandwidth 401 as for the previous embodiment.
2. Upon the success of frequency, symbol, and time synchronisation and cell identity determination in step (1) above, the low cost LTE based MTC device 100 with reduced BW option DL-3 shall perform reception and decoding of the PBCH/BCH/BCCH carrying the MIB 403 on the fixed 1.4 MHz bandwidth 401 as for the previous embodiment.
3. On the completion of MIB acquisition in step (2), the low cost LTE based MTC device 100 with reduce BW option DL-3 has acquired information on carrier DL-BW information 404 for the arrangement of PRBs within the initial reduced DL BW. Then, still with reference to FIG. 6, the low cost LTE based MTC device 100 with reduced BW option DL-3, on a predetermined frame number and subframe number:
3.1. performs blind detection of PRB(s) carrying ePDCCH and perform blind detection of CFI 420-a on the reduced DL-BW to determine the control region 420; and
3.2. performs common search 421-a to determine the control information for reception of associating PDSCH/DL-SCH carrying SIB1 432.

At this stage, the low cost LTE based MTC device 100 with reduced BW option DL-3 is able to operate within an initial reduced DL BW for reception and demodulation of both control and data channels using blind detection of PRBs carrying ePDCCH, blind detection of CFI, and common search on ePDCCH feature, As will be appreciated from the foregoing description, in this embodiment there is a duplication of the DCI for the reception of PDSCH/DL SCH/SIB1. That is, the transmitting eNB 300 sends the DCI in both a common search region 421 of the control region 420, and in a common search region 421 a of the ePDCCH 420-a. Advantageously, this eliminates signal processing on the full carrier DL bandwidth for the control channel and streamlines the signal processing for MTC within a reduced bandwidth for both control and data channels.

Further processing then proceeds as follows.
4. On the completion of SIB1 acquisition in step (3) above, the device 100 has acquired information for evaluating if it is allowed to access a cell and determining the scheduling of MTC-SIB. If the low cost LTE based MTC device 100 with reduced BW option DL-3 is allowed to access the cell, it uses the MTC-SIB scheduling information to determine frame and subframe, wherein it:
4.1. performs blind detection of PRB(s) carrying ePDCCH(s) and performs blind detection of a CFI 422-a on the reduced DL-BW to determine the control region 422; and
4.2. performs common search 423-a) to determine the control information for the reception of associating PDSCH/DL-SCH carrying MTC-SIB 433-a.

Upon successful of MTC-SIB 433-a acquisition, the low cost LTE based MTC device 100 with reduced BW option DL-3 now has information on cell MTC allocated resources, and random access resources, including information that it can use in an initial random access process to assist the eNB 300 to recognize its single Rx RF chain capability and MTC service class. Thus the eNB 300 shall be able to compensate the cell coverage degradation in DL due to the single Rx RF chain It will further be appreciated that operation of the air interface 400 in accordance with an embodiment the invention as described above with reference to FIG. 6 enables a low cost LTE based MTC device 100 to operate within a reduced DL BW for both control and data channels during the initial network access stages. This resolves the issues associated with system 400(a) described with reference to FIG. 2 above and enables the 3GPP RAN-WG1's reduced DL BW option DL-2 to be realised without 3GPP specification changes. This latter feature is illustrated in FIG. 7, in which it can be seen that a low cost LTE based MTC device 100 with reduced BW option DL-2, having access only to a reduced RF and baseband BW within the data region, and without requiring access to the legacy control region, is able to acquire the SIB1, the MTC-SIB and the PDSCH 438 carrying the DL-SCH/PCH/RA-Res.

FIG. 8 further illustrates the above procedures through a Message Sequence Chart (MSC) 850, corresponding with an initial procedure for accessing an LTE network by an MTC UE. Following power on 852, the MTC UE receives the PSS/SSS 854 from the eNB. This enables the MTC UE, at 856, to perform duplex detection, network time and frequency synchronisation.

The eNB sends 858 the MIB/BCCH/BCH/PBCH, which enables the MTC UE to perform MIB acquisition 860.

The eNB then sends SIB1/BCCH/DL/SCH/PDSCH, wherein the control information is mapped onto legacy PDCCH/common search and MTC EPDCCH/common search. From this, the MTC UE performs SIB1 acquisition 864.

The eNB then sends 866 the MTC/SIB/BCCH/DL-SCH/PDSCH, wherein the control information is mapped on MTC EPDCCH/common search, enabling the MTC UE to perform MTC-SIB acquisition 868.

Thereafter, the MTC UE is able to initiate a random access procedure 870, for obtaining transmission resources via the air interface 400. In accordance with embodiments of the invention, the eNB is able to identify, by use of a specific preamble sequence, random access requests from low-cost LTE-based MTC devices, with single received RF chain, and increase transmission power accordingly in order to compensate for cell coverage loss when transmitting back to the MTC UE.

The overall procedures embodying the invention are further illustrated by the flowcharts in FIGS. 9A, 9B and 9C.

In particular, the flowchart 900 illustrates a method embodying the invention as conducted by a wireless base station (i.e. eNB). At step 902 the eNB transmits a first control message within the control region of a subframe, i.e. a first DCI, which identifies a location of a second control message within the data region of the subframe, i.e. the SIB1.

At step 904, in order to provide support for a DL-2 option, the first control message (i.e. first DCI) is duplicated, by a transmission within a reduced bandwidth of the data region. In particular, in embodiments of the invention the duplicated DCI is transmitted within an ePDCCH configured for blind detection by an MTC UE.

At step 906, the eNB transmits a second control message (i.e. an SIB1) which comprises scheduling information of a third control message (i.e. the MTC-SIB) which will be transmitted within the data region of a subsequent subframe.

At step 908, the eNB transmits the second DCI for the reception of the third control message within a reduced bandwidth of the data region. In particular, in embodiments of the invention the second DCI is transmitted within an ePDCCH configured for blind detection by an MTC UE. The second DCI comprises location information and control information for the reception and demodulation of a third control message, i.e. the MTC-SIB, within a PDSCH of the data region of the subframe, which is transmitted by the eNB at step 910.

FIG. 9B shows a flowchart 911 illustrating a method implemented within a wireless device, i.e. an MTC UE, having a DL-3 option, providing reduced bandwidth in a data channel in baseband, while allowing access to the full carrier bandwidth within the control channels.

At step 912, the MTC UE receives a first control message (i.e. a DCI) transmitted within the control region of a subframe. The DCI enables the MTC UE to locate and receive a second control message, i.e. an SIB1, at step 914.

At this stage, the MTC UE having a DL-3 option no longer requires access to the full carrier bandwidth within the control channel, and therefore may optionally reduce the RF bandwidth, at step 916, in order to reduce power consumption.

At step 918, the MTC UE receives a second DCI located within a common search region of an ePDCCH, which has been configured for blind detection, within the data region of a subsequent subframe. The second DCI comprises location information of a third control message, i.e. the MTC-SIB, within a PDSCH of the data region of the subframe, which is received by the MTC UE at step 920.

FIG. 9C is a flowchart 921 illustrating a method in a wireless base station having a DL-2 option, i.e. reduced baseband bandwidth in both control and data channels.

At step 922, the MTC UE receives a first control message, i.e. a DCI, by common search of an ePDCCH transmitted within a reduced bandwidth of the data region of a subframe. The DCI comprises location information of a second control message, i.e. an SIB1, located within a PDSCH, also within the reduced bandwidth of the data region of the subframe. The SIB1 is received by the MTC UE at step 924.

At step 926 the MTC UE having option DL-2 receives a second DCI by common search within an ePDCCH transmitted within the data region of a subsequent subframe. The second DCI comprises location information of a third control message, i.e. an MTC-SIB, within a PDSCH of the data region of the subframe. The MTC-SIB is then received by the MTC UE at step 928.

Embodiments of the invention, comprising an MTC-SIB with key attributes specified above and employing common search on an ePDCCH with blind detection of PRBs carrying ePDCCHs and blind detection of the CFI, have numerous advantages, including allowing the eNB 300 to realise multiple configurable reduce DL bandwidth options for MTC on the same larger carrier bandwidth.

This advantageously enables low cost LTE based MTC device(s) with reduced bandwidth capability, such as option DL-3, to operate:
- on a configurable reduced bandwidth different from the central reduced bandwidth section; and
- using multiple and configurable reduced bandwidth portions, including the central reduced bandwidth section, simultaneously.

These benefits may be realised, for example, by providing an MTC-specific UE category consisting of two sub-classes:
1. MTC-specific UE category 1, operating on a fixed and predefined reduced bandwidth located at the centre of the carrier DL bandwidth, and
2. MTC-specific UE category 2, operating on single or multiple configurable reduced bandwidth sections, including the central reduced bandwidth section, within the larger carrier DL bandwidth, Common search and UE specific search on ePDCCH(s) within the configured reduce bandwidth are supported by low cost LTE based MTC device.

It will be understood that the foregoing description of preferred embodiments is provided by way of example only, and should not be taken to exclude from within the scope of the invention any variations or modifications which may be apparent to the person skilled on the art, or which do not deviate from the general principals of the invention as disclosed herein. The scope of the invention is thus as defined by the appended claims.

This application is based upon and claims the benefit of priority from Australian Patent Application No. 2012904117, filed on Sep. 21, 2012, the disclosure of which is incorporated herein in its entirety by reference.

REFERENCE SIGNS LIST

100 MTC DEVICE
150, 151 CELL COVERAGE
200 LTE USER EQUIPMENT (UE)
250 CELL COVERAGE
300 ENHANCED Node B (eNB)
400 AIR INTERFACE
402 PRIMARY SYNCHRONISATION SIGNAL (PSS) AND SECONDARY SYNCHRONISATION SIGNAL (SSS)
403 PBCH/BCH/BCCH CARRYING MASTER INFORMATION BLOCK (MIB)
404 DL BANDWIDTH
410 MTC REDUCED BW
420, 422 CONTROL REGION
421, 423, 436, 437 COMMON SEARCH
432, 433 PDSCH/DL-SCH/BCCH CARRYING SIB
438 PDSCH CARRYING DL-SCH/PCH/RA-RES
441 PDSCH/DL-SCH CARRYING PCH OR RANDOM ACCESS RESPOND (RA-Res)
500 LTE CORE NETWORK (MOBILE COMMUNICATION CORE NETWORK)
600 EXTERNAL MTC SERVER
700 MTC APPLICATION SERVER
800 EXTERNAL IP NETWORK
1000 COMMUNICATION NETWORK

The invention claimed is:

1. A method in a wireless device having a reduced bandwidth, the method comprising:
   receiving control and data signaling transmitted by a wireless base station within a first bandwidth in respective control and data regions, the control and data signaling being received by the wireless device within a second bandwidth which is narrower than the first bandwidth;
   receiving a first control message within the data region, the first control message comprising location information of a second control message within the data region;
   receiving the second control message which comprises scheduling information of a third control message within the data region; and
   receiving the third control message which comprises information identifying resources allocated by the wireless base station for use by wireless devices having the reduced bandwidth.

2. The method of claim 1 which comprises performing blind detection of the first control message which comprises a first downlink control information (DCI) message located within one or more enhanced physical downlink control channels (ePDCCHs).

3. A wireless user equipment (UE) having a reduced bandwidth, the wireless UE comprising:
   a receiver to receive control and data signaling transmitted by a wireless base station within a first bandwidth in respective control and data regions, the control and data signaling being received by the wireless device within a second bandwidth which is narrower than the first bandwidth, and
   a communications processor configured to:
   receive a first control message within the data region, the first control message comprising location information of a second control message within the data region;

receive the second control message which comprises scheduling information of a third control message within the data region; and receive the third control message which comprises information identifying resources allocated by the wireless base station for use by wireless devices having the reduced bandwidth.

4. The wireless UE of claim 3 wherein the communications processor is configured to perform blind detection of the first control message which comprises a first downlink control information (DCI) message located within one or more enhanced physical downlink control channels (ePDCCHs).

\* \* \* \* \*